(12) United States Patent
Valensa et al.

(10) Patent No.: US 8,263,280 B2
(45) Date of Patent: Sep. 11, 2012

(54) COMPACT AIR PREHEATER FOR SOLID OXIDE FUEL CELL SYSTEMS

(75) Inventors: Jeroen Valensa, Muskego, WI (US); Liping Cao, Racine, WI (US); Mark G. Voss, Franksville, WI (US); Nicholas Siler, Franksville, WI (US)

(73) Assignee: Modine Manufacturing Company, Racine, WI (US)

( * ) Notice: Subject to any disclaimer, the term of this patent is extended or adjusted under 35 U.S.C. 154(b) by 0 days.

(21) Appl. No.: 13/241,430

(22) Filed: Sep. 23, 2011

(65) Prior Publication Data

US 2012/0015258 A1     Jan. 19, 2012

Related U.S. Application Data

(62) Division of application No. 11/778,478, filed on Jul. 16, 2007, now Pat. No. 8,048,583.

(60) Provisional application No. 60/832,198, filed on Jul. 20, 2006.

(51) Int. Cl.
*H01M 8/04* (2006.01)
*H01M 8/10* (2006.01)
(52) U.S. Cl. ......... 429/440; 429/434; 429/441; 429/495
(58) Field of Classification Search .................. 429/433, 429/434, 439–442, 495
See application file for complete search history.

(56) References Cited

U.S. PATENT DOCUMENTS

| | | | |
|---|---|---|---|
| 5,158,837 A * | 10/1992 | Misawa et al. | 429/444 |
| 6,919,055 B2 | 7/2005 | Kondo et al. | |
| 6,921,596 B2 | 7/2005 | Kelly et al. | |
| 7,144,644 B2 | 12/2006 | Haltiner, Jr. et al. | |
| 7,322,405 B2 | 1/2008 | Ogawa | |
| 2002/0081468 A1* | 6/2002 | Shioya | 429/19 |
| 2003/0054210 A1 | 3/2003 | Gillett et al. | |
| 2004/0013913 A1 | 1/2004 | Fabis et al. | |

FOREIGN PATENT DOCUMENTS

DE   102005015874   7/2006

OTHER PUBLICATIONS

Office Action from German Patent Office for Application No. 102007033864.5-45 dated Jul. 6, 2009 (7 pages).

* cited by examiner

*Primary Examiner* — Eugenia Wang
(74) *Attorney, Agent, or Firm* — Michael Best & Friedrich LLP

(57) ABSTRACT

The invention provides a solid oxide fuel cell system including a fuel cell stack having an anode side and a cathode side, an anode tailgas oxidizer for oxidizing an anode exhaust flow from the anode side to produce an oxidized anode exhaust flow, and a heat exchanger. The heat exchanger includes a first inlet for receiving a cathode exhaust flow from the cathode side of the fuel cell stack, a second inlet for receiving the oxidized anode exhaust flow, and a mixing region for combining the cathode exhaust flow and the oxidized anode exhaust flow to produce a combined exhaust flow. An air flow path for supplying air to the fuel cell stack to support an energy-producing reaction in the fuel cell stack extends through the heat exchanger so that heat is transferred from the combined exhaust flow to the air traveling along the air flow path.

11 Claims, 8 Drawing Sheets

COMPACT AIR PREHEATER FOR SOLID OXIDE FUEL CELL SYSTEMS

CROSS-REFERENCE TO RELATED APPLICATIONS

This application is a divisional of U.S. patent application Ser. No. 11/778,478, filed Jul. 16, 2007, and issued as U.S. Pat. No. 8,048,583 on Nov. 1, 2011, which application claims priority to U.S. Provisional Patent Application No. 60/832,198, filed Jul. 20, 2006, the entire contents of both of which are incorporated by reference.

FIELD OF THE INVENTION

The present invention relates to heat exchangers, and more particularly relates to heat exchangers for solid oxide fuel cells, and most particularly relates to recuperative heat exchangers in a solid oxide fuel cell auxiliary power unit for transport applications.

SUMMARY OF THE INVENTION

It is highly desirable for electrolyte to be stable in both oxidizing and reducing atmospheres, and for the electrolyte to have a sufficiently high ionic conductivity at operating temperatures along with a sufficiently low electronic conductivity. Stabilized zirconia, possessing a fluorite structure, is a highly developed electrolyte, and has a typical suitable operating temperature of approximately 800° C.

During operation, fuel cell stacks can produce both heat and electric power. The heat can be removed from a fuel cell stack at an appropriate rate in order to maintain the operating temperature of the stack. The oxidizing gas flow, which can include air, can be used as a cooling flow stream to remove the majority of the excess heat produced in the fuel cell stack.

Although it may be thermodynamically feasible to deliver air to the fuel cell stack at a temperature well below the operating temperature of the stack, having too large of a thermal gradient in the air flow through the stack can cause thermal stress induced cracking of the ceramic and rapid structural failure of the fuel cell stack. Accordingly, at least some of the excess heat from the fuel cell stack and/or from the reactant streams can be recovered and used to preheat the incoming cathode air to a temperature somewhat less than the stack temperature. Air can also or alternatively be directed to the cathode so that the excess heat produced in the stack can be removed and the fuel cell stack can be maintained at a desired operating temperature.

Heating of the fuel cell stack during the startup period can also or alternatively be accomplished via preheating of the air flowing through the fuel cell cathodes. During this time, combustion of a fuel flow can provide the heat source for the air preheating. By efficiently transferring heat energy, it can be possible to reduce and/or minimize the start-up time.

A heat exchanger to preheat the cathode air for a solid oxide fuel cell system can provide a significant portion of the size, weight, and cost of an entire fuel cell system. In most applications, this heat exchanger must be capable of achieving highly effective heat transfer between low pressure gas streams, thus necessitating a large device. The operating temperatures often require that the device be constructed of high temperature capable materials. Such materials are inherently more expensive than more conventional materials (e.g., stainless steels), which are not capable of operating at these temperatures for extended periods of time. Furthermore, thermally induced stresses make it difficult to successfully use thin materials in the construction of such a device, leading to even more of a cost and weight penalty. Increased weight and size are especially detrimental for transportation applications.

In some embodiments, the present invention provides a compact, light-weight, highly effective heat exchanger to preheat cathode air for startup and/or steady-state operation. The present invention can also or alternatively provide an improved heat exchanger that, among other things, pre-mixes an incoming pair of fluid flows to provide a combined fluid flow for transferring heat energy to yet another fluid flow.

In some embodiments, the present invention provides a heat exchanger, which preheats a fresh air stream to a temperature suitable for an inlet of a cathode side of a solid oxide fuel cell stack by transferring heat energy from a cathode exhaust flow exiting the cathode side of the solid oxide fuel cell stack and from an exhaust flow exiting the anode side of the solid oxide fuel cell stack. In some embodiments, the exhaust flow exiting the anode side of the solid oxide fuel cell can include oxidized exhaust gas exiting an anode tailgas oxidizer. The term "fresh air" is used herein to refer to air or air mixtures that have not been exposed to the cathode side of a fuel cell.

The present invention also enables rapid startup of a solid oxide fuel cell system by efficiently transferring heat energy from a combustion exhaust gas exiting an anode tailgas oxidizer to a cold fresh air stream which is subsequently directed through the cathode side of a solid oxide fuel cell stack. In some embodiments, the heat exchanger of the present invention accomplishes the foregoing while at the same time reducing the size and weight of the device, and/or reducing the thermal stress within the device to thereby improve its useful life.

In some embodiments, the present invention achieves the foregoing in a cathode air preheater heat exchanger that includes a hot gas mixing section to receive a cathode exhaust flow from a first cathode exhaust inlet port and an anode tailgas oxidizer exhaust flow (or during startup operation a startup burner exhaust flow) from a second exhaust inlet port and to adiabatically blend the two flows into a combined exhaust flow that is substantially homogeneous in composition and temperature. The heat exchanger can include a first elongated exhaust flow passage with an inlet at one end that receives the combined exhaust flow, and an outlet at the other end that is fluidly connected to an exhaust gas exit port. The heat exchanger can also include a second elongated fresh air flow passage in heat exchange relation with the first exhaust flow passage with an inlet end and an opposite outlet end. The inlet end can be adjacent to the exhaust flow passage outlet end and the outlet end can be adjacent to the exhaust flow passage inlet end so that countercurrent flow occurs between the combined exhaust gas and the fresh air.

Heat transfer enhancements can be located in one or both of the first exhaust gas flow passage and the second fresh air flow passage. The present invention can also or alternatively include a fresh air mixing region that receives a first heated fresh air flow from the second fresh air flow passage and a second unheated fresh air flow from a bypass fresh air inlet port and combines the two fresh air flows into a third blended fresh air flow to be supplied to the cathode electrodes of a solid oxide fuel cell stack.

In some embodiments, at least portions of the first exhaust flow passage and the second fresh air flow passage are concentric annular flow passages. Alternatively or in addition, the first exhaust gas flow passage and the second fresh air flow passage can include a turbulator, a fin (e.g., a high-efficiency fin such as a serpentine louvered fin or a lanced and offset fin), and/or other heat transfer surface augmentations. In some embodiments, the second exhaust inlet port can be directly connected to the exhaust port of an anode tailgas oxidizer.

The present invention also provides a method of preheating cathode air including the acts of providing a thermally conductive elongated wall having opposite sides, providing heat transfer enhancements on one or both sides of the thermally conductive elongated wall, and directing a hot gas stream including a solid oxide fuel cell cathode exhaust flow, an anode tailgas oxidizer exhaust flow, and/or a startup burner exhaust flow along one side of the wall generally in the direction of elongation thereof. The method can also or alternatively include the act of directing a portion of a desired cathode air flow along the other side of the wall in countercurrent relation to the hot gas stream to cause the portion of the desired cathode air flow to be heated, and adding the unheated remaining portion of the desired cathode air flow to the heated portion of the desired cathode air flow to result in a desired cathode air flow at a desired cathode air inlet temperature.

In some embodiments, the present invention provides a method of operating a solid oxide fuel cell system including a fuel cell stack. The method can include the acts of combining an exhaust flow from an anode side of the fuel cell stack and an exhaust flow from a cathode side of the fuel cell stack, transferring heat from the combined exhaust flow to a first air flow, and combining a second air flow and the heated first air flow upstream from the fuel cell stack to control a temperature of the combined air flow entering the cathode side of the solid oxide fuel cell.

The present invention also provides a method of starting a fuel cell stack of a solid oxide fuel cell system from a temperature below an operating temperature. The method can include the acts of combining an oxidizer exhaust flow and an exhaust flow from a cathode side of the fuel cell stack, and transferring heat from the combined exhaust flow to an air flow entering the cathode side of the fuel cell stack.

In some embodiments, the present invention also provides a heat exchanger for a solid oxide fuel cell system including a first inlet for receiving an exhaust flow from an anode side of a fuel cell stack, a second inlet for receiving air, a third inlet for receiving an exhaust flow from a cathode side of the fuel cell stack, and a first tube supported in a second tube. One of the first tube and the second tube can at least partially define a flow path for the exhaust flows from the cathode and anode sides of the fuel cell stack and the other of the first tube and the second tube can at least partially define a flow path for supplying the air to the fuel cell stack. The second flow path can be counter to the first flow path.

Also, the present invention provides a method of operating a solid oxide fuel cell system including a fuel cell stack. The method can include the acts of directing an air flow through a first tube of a heat exchanger, and directing an exhaust flow from a cathode side of the fuel cell stack and an exhaust flow from an anode side of the fuel cell stack through a second tube of the heat exchanger to transfer heat from the exhaust flow to the air flow to preheat the air flow before directing the air flow into a cathode side of the fuel cell stack. One of the first tube and the second tube can be supported in the other of the first tube and the second tube.

In some embodiments, the present invention provides a solid oxide fuel cell system including a fuel cell stack having an anode side and a cathode side, a heat exchanger including a first inlet for receiving an exhaust flow from the cathode side of the fuel cell stack and a second inlet for receiving an exhaust flow from the anode side of the fuel cell stack, a mixing chamber for combining the exhaust flow from the cathode and anode sides of the fuel cell, and a flow path for supplying air to the fuel cell stack and extending through the heat exchanger so that heat is transferred from the combined exhaust flow to the air traveling along the flow path.

Metallic alloys capable of withstanding extended exposure to oxidizing flows at high temperatures can be used in the construction of the invention or portions of the invention. Alternatively or in addition, portions of the device that are exposed to higher temperatures than other portions of the device may be constructed of materials that have greater corrosion resistance than do the materials used to construct other portions of the device. For example, the second exhaust inlet and the exhaust mixing region can be exposed to the anode tailgas oxidizer exhaust, which can have temperatures in excess of 1100° C. After the combustion exhaust is mixed with the cathode exhaust, the mixed temperature can be 200° C. lower. The material requirements for the remainder of the device can therefore be lower than the requirements for the combustion exhaust inlet and the exhaust mixing region.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Also, it is to be understood that phraseology and terminology used herein with reference to device or element orientation (such as, for example, terms like "central," "upper," "lower," "front," "rear," and the like) are only used to simplify description of the present invention, and do not alone indicate or imply that the device or element referred to must have a particular orientation. In addition, terms such as "first" and "second" are used herein for purposes of description and are not intended to indicate or imply relative importance or significance.

Figure 1:
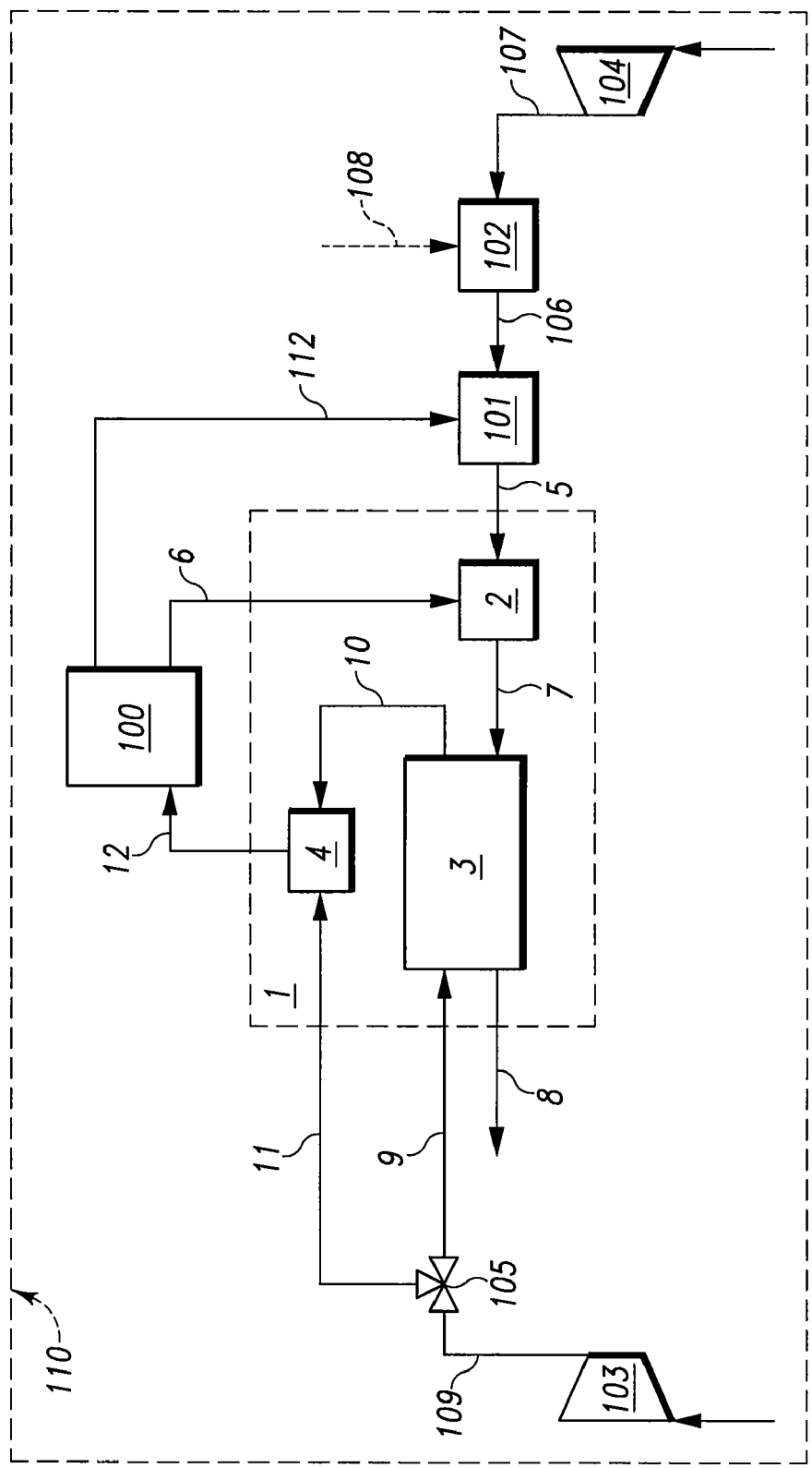
FIG. 1 is a partial schematic view of a solid oxide fuel cell system including a cathode air preheater made according to the present invention.

FIG. 1 shows a heat exchanger 1 embodying the present invention within a solid oxide fuel cell system 110. Although the invention is shown in the context of a solid oxide fuel cell system 110, it should be understood that heat exchangers according to the present invention can and will find use in other applications. Accordingly, no limitation to the use of heat exchangers according to the invention with fuel cell systems or with particular types of fuel cell systems is intended, unless expressly recited in the claims.

As shown in FIG. 1, the heat exchanger 1 can be an air preheating heat exchanger and can include a hot exhaust mixing region 2, a heat exchange region 3, and a fresh air mixing region 4. In other embodiments, the hot exhaust mixing region 2 or a portion of the hot exhaust mixing region 2 can be positioned upstream from or adjacent to the preheating heat exchanger 1 so that a pre-mixed or combined exhaust gas flow enters a common exhaust gas inlet of the heat exchanger 1. Alternatively or in addition, the fresh air mixing region 4 or a portion of the fresh air mixing region 4 can be positioned downstream from or adjacent to a portion of the preheating heat exchanger 1.

In the illustrated embodiment of FIGS. 1-6, the hot exhaust mixing region 2 receives a cathode exhaust flow 6 from the cathode side of a solid oxide fuel cell stack 100, and an anode exhaust flow 5 from an anode tailgas oxidizer 101. In other embodiments, exhaust gas from other portions or elements of the solid oxide fuel cell system 110 or other heated fluids can also or alternatively be directed to the exhaust mixing region 2 and can be combined with the cathode exhaust flow 6 and/or the anode exhaust flow 5. In still other embodiments, exhaust gas from other portions or elements of the solid oxide fuel cell system 110 or other heated fluids can be combined or mixed with the cathode exhaust flow 6 and/or the anode exhaust flow 5 before being directed into the exhaust mixing region 2.

During normal steady-state operation of the fuel cell system 110, the anode exhaust flow 5 can include the products of an oxidation reaction between an anode exhaust flow 112 received by the anode tailgas oxidizer 101 from the anode side of the fuel cell stack 100 and a flow stream 106 including an air flow 107 provided by an air blower 104. During start-up of the fuel cell system 110, when it is desirable to rapidly provide heat to elements of the fuel cell system 110 and when a combustible anode exhaust gas flow stream 112 might not yet be available for oxidation within the anode tailgas oxidizer 101, the flow stream 106 can include the products of a combustion reaction occurring within a start burner 102 positioned between the air flow 107 and a fuel source 108.

Figure 3:
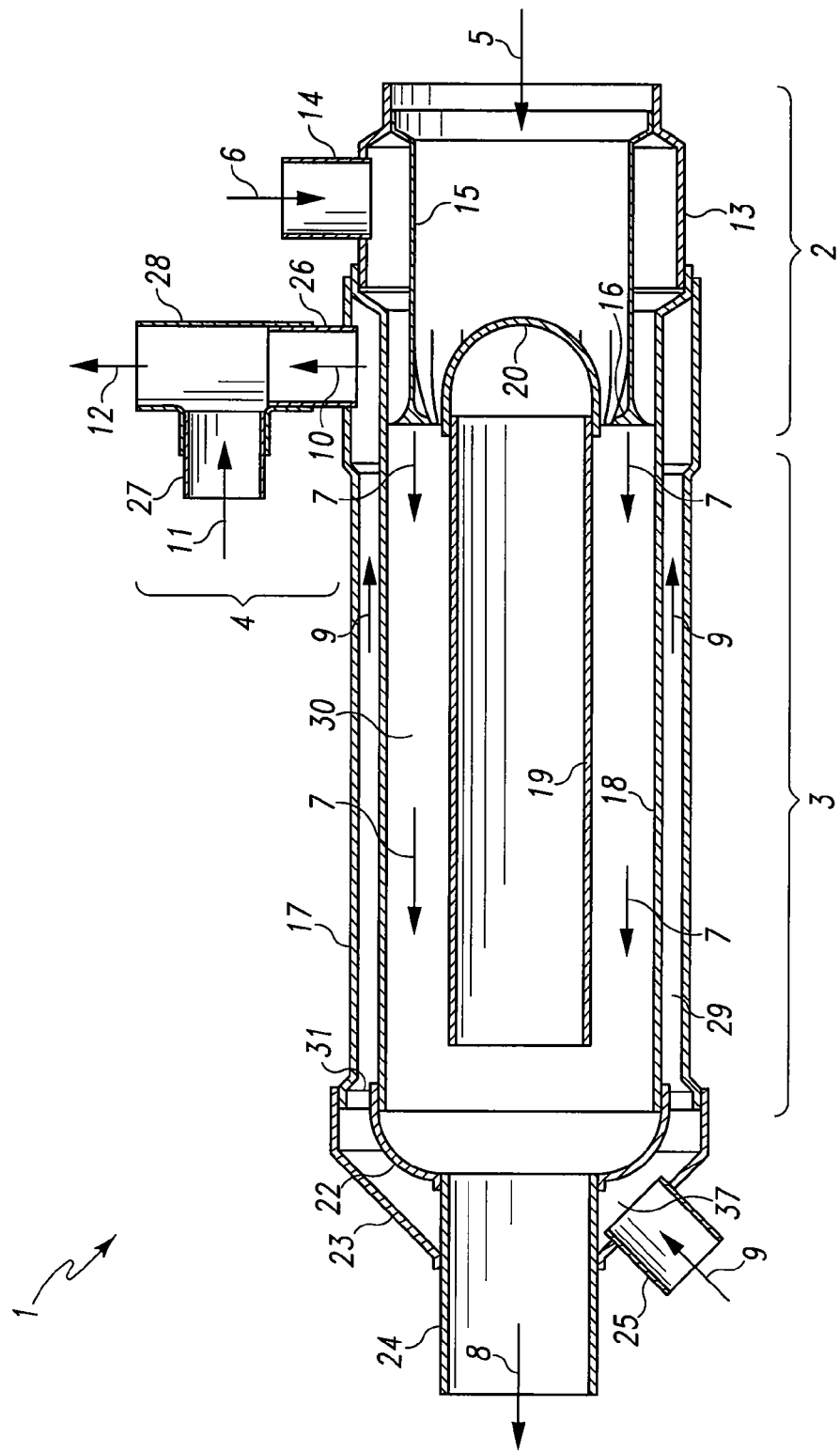
FIG. 3 is a sectional plan view of the cathode air preheater of FIG. 2.

As shown in FIGS. 1 and 3, the cathode exhaust flow 6 and the anode exhaust flow 5 can be combined and/or blended to provide a combined exhaust flow 7. In some embodiments, the combined exhaust flow 7 can be homogeneous in composition and temperature. In other embodiments, the combined exhaust flow 7 can be partially mixed or combined such that the flow or portions of the flow have different compositions and different temperatures. The combined exhaust flow 7 can travel through the heat exchange region 3 of the heat exchanger 1, where it rejects heat and can exit as a cooled exhaust flow 8.

In some embodiments, an air blower 103 can provide a fresh air flow 109 to a valve or other flow separator 105 that splits the fresh air flow 109 into a first air flow 9 and a bypass or second air flow 11. In some such embodiments, the valve 105 can vary the relative proportions of the first and second air flows 9, 11 in response to a control signal and/or a manual adjustment. As shown in FIG. 1, the first air flow 9 of the fresh air flow 109 can enter the heat exchange region 3 and can be heated. Heated air 10 can exit the heat exchange region 3 and can be directed toward the fresh air mixing region 4, where it can be recombined with the second air flow 11 to provide a combined cathode air flow 12.

Figure 2:
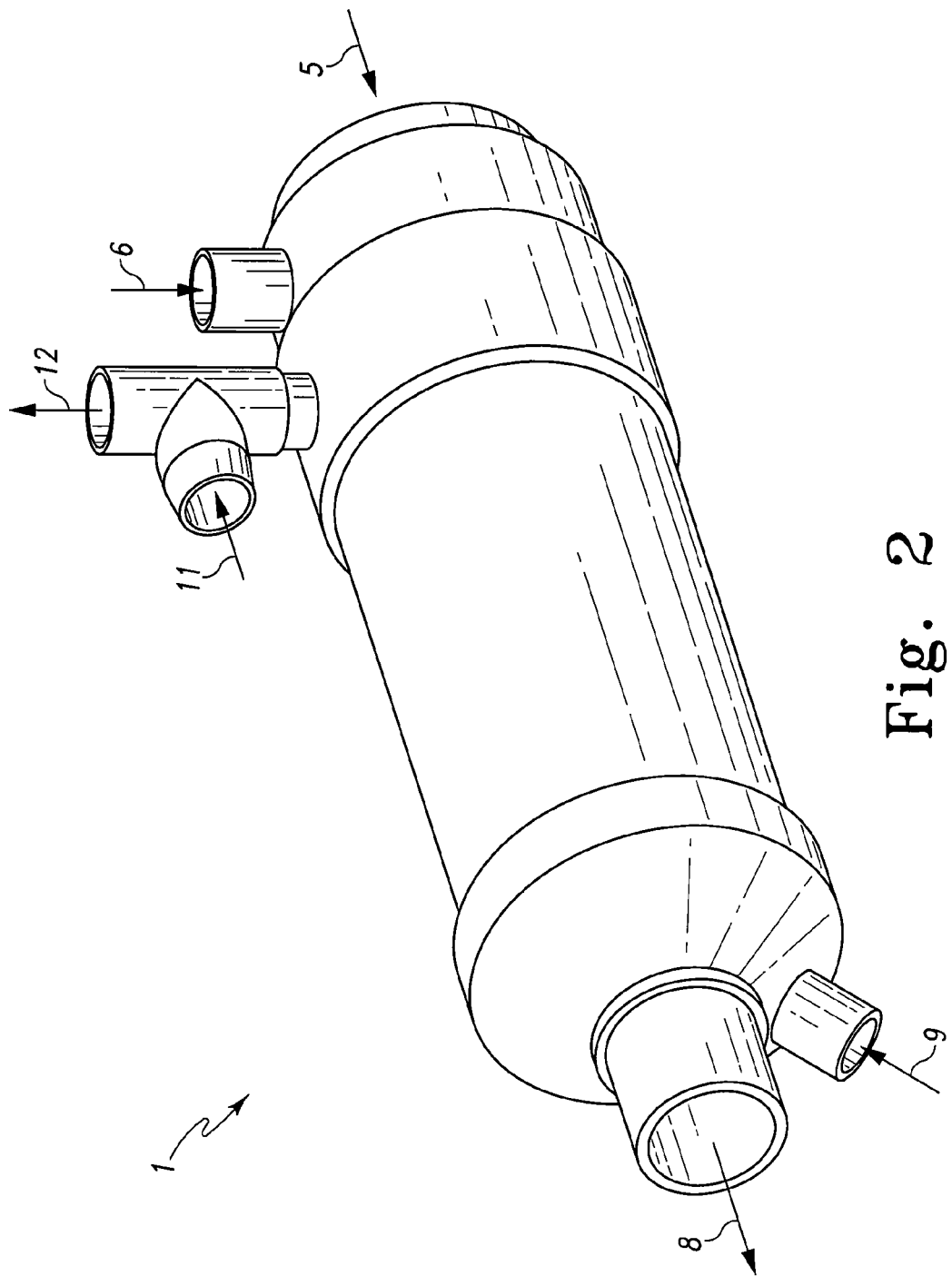
FIG. 2 is a perspective view of one embodiment of a cathode air preheater according to the present invention.
Figure 4:
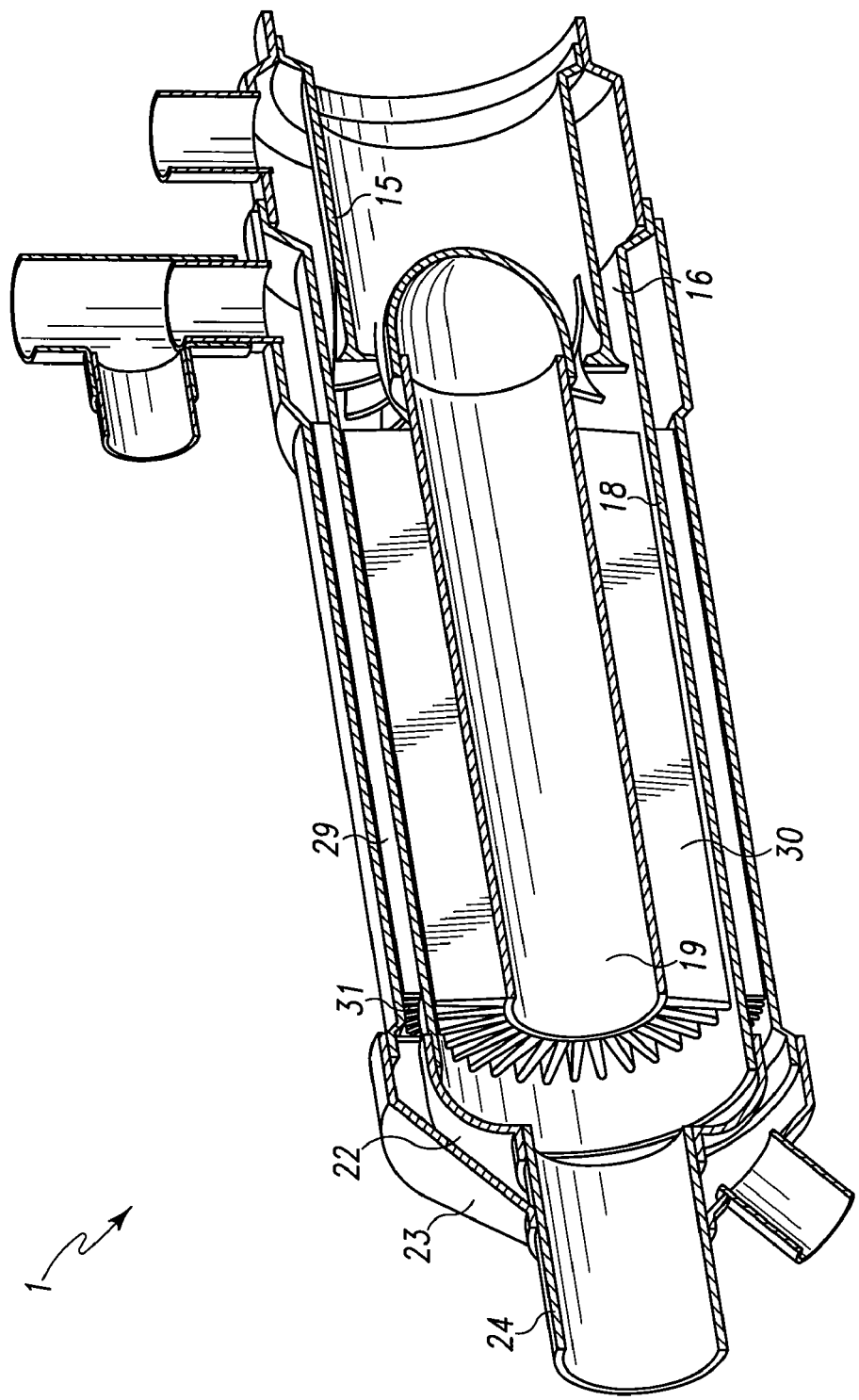
FIG. 4 is a broken perspective view of the cathode air preheater of FIG. 2.

In some embodiments, such as the illustrated embodiment of FIGS. 2-4, the hot exhaust mixing region 2 can be supported in the heat exchanger 1 and can include an inlet tube 13 at least partially defining an exhaust gas inlet, an inner tube 15 supported in the inlet tube 13, a first heat exchange tube 18, a second heat exchange tube 17, a cathode exhaust inlet port 14, a baffle dome 20, and mixing structures 16. In other embodiments, the hot exhaust mixing region 2 can have other shapes and constructions and can be formed of or at least partially formed of one, two, or more housing members having circular or non-circular cross-sectional shapes.

In the illustrated embodiment of FIGS. 2-4, the anode exhaust flow 5 enters the hot exhaust mixing region 2 by flowing through an interior of the inlet tube 13 and subsequently flowing through an interior of the inner tube 15. In the illustrated embodiment of FIGS. 2-4, the cathode exhaust flow 6 enters the hot exhaust mixing region 2 through the cathode exhaust inlet port 14, which passes through the inlet tube 13. The cathode exhaust flow 6 then travels in an annular region formed by the outer surface of the inner tube 15 and the inner surfaces of the inlet tube 13 and the first heat exchange tube 18 in a direction concurrent with the anode exhaust flow 5. The anode exhaust flow 5 contacts the baffle dome 20 and is thereby directed into an annular flow area bounded by the inner surface of the inner tube 15 and the outer surface of the dome 20. In other embodiments, the anode exhaust flow 5 and/or the cathode exhaust flow 6 can flow through the hot exhaust mixing region 2 and/or be mixed in different manners.

As shown in FIGS. 3-5c, a mixing structure 16 can be supported in the hot exhaust mixing region 2 to combine and/or mix the anode exhaust flow 5 and/or the cathode exhaust flow 6. In the illustrated embodiment of FIGS. 3 and 4, the mixing structure 16 is integrally formed with the inner tube 15 and can efficiently mix the anode exhaust flow 5 and the cathode exhaust flow 6, resulting in a well-mixed combined exhaust flow 7 exiting the hot exhaust mixing region 2.

In some embodiments, such as the illustrated embodiments of FIGS. 3-5c, the mixing structure 16 is constructed so as to enable an efficient mixing of the anode exhaust flow 5 and the cathode exhaust flow 6 without incurring a significant pressure loss, in order to minimize the parasitic power required to pressurize the sources of the anode and cathode exhaust flows 5, 6. As shown in FIGS. 3 and 4 and in more detail in FIG. 5a, the mixing structure 16 can include a number of arcuately-shaped turning vanes 32 that direct the anode exhaust flow 5 and the cathode exhaust flow 6 in a generally radial direction through the hot exhaust mixing region 2.

Figure 5A:
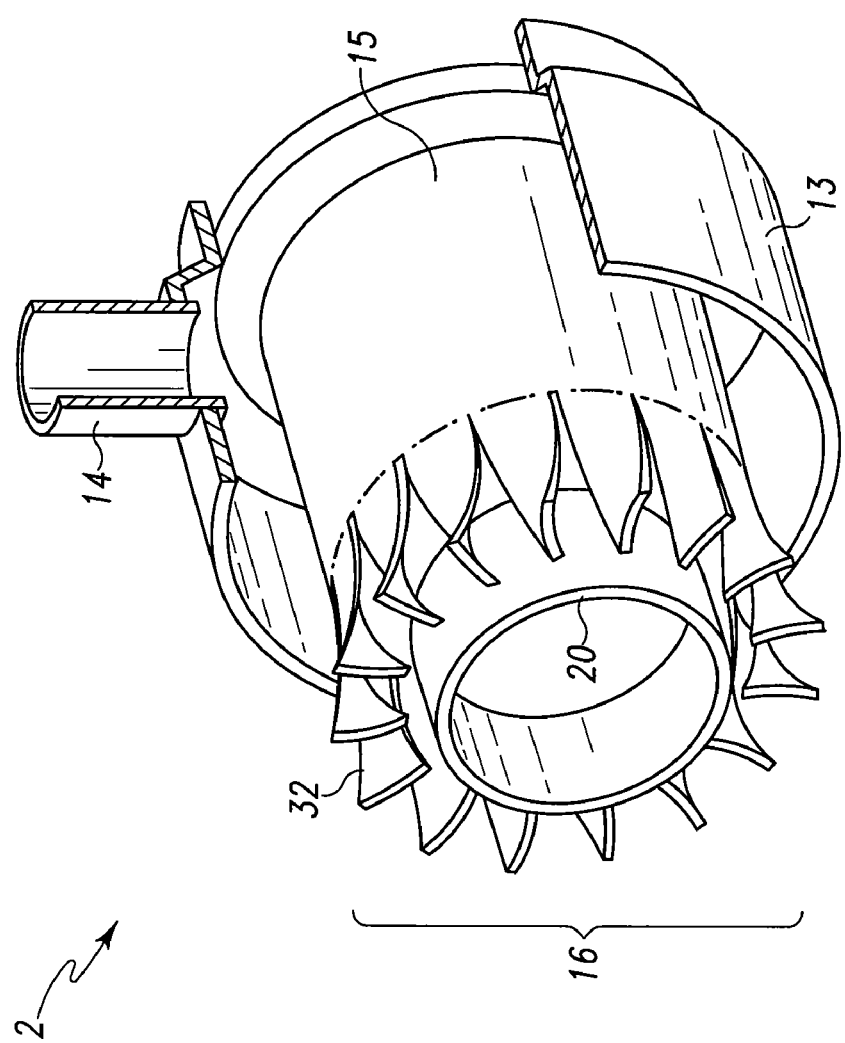
FIGS. 5a-5c are fragmentary perspective views of three embodiments of an exhaust mixing region according to the invention.
Figure 5B:
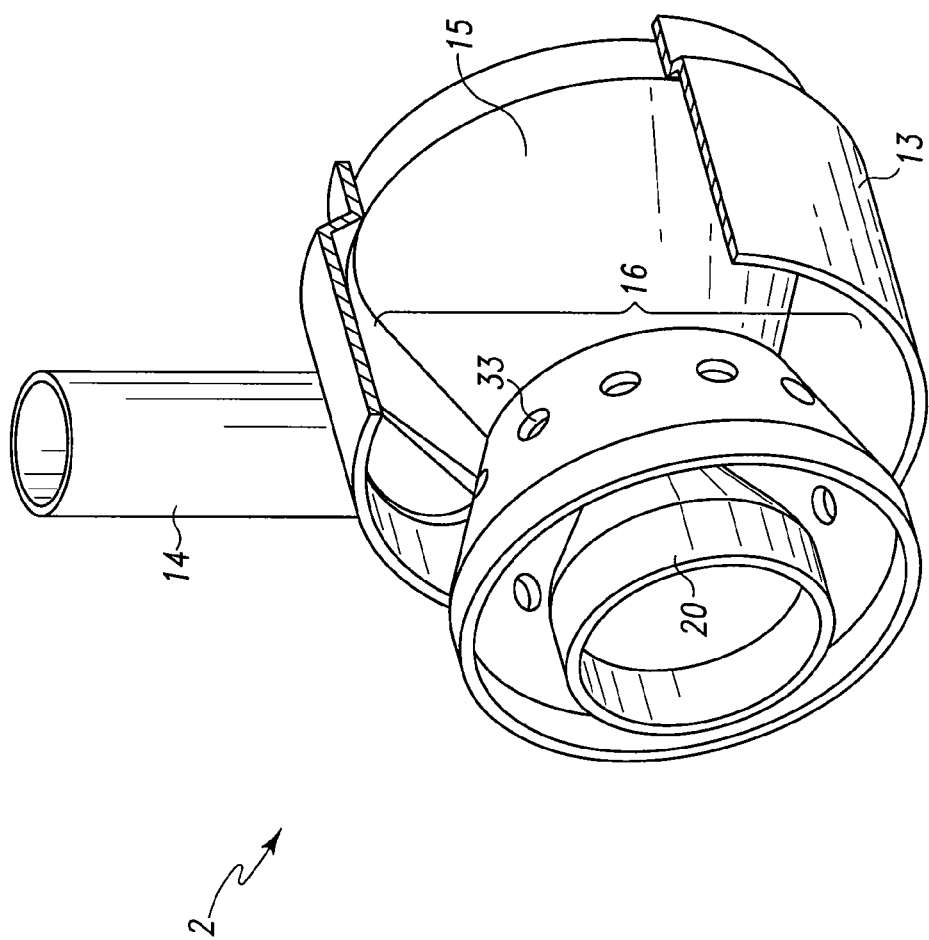
Figure 5C:
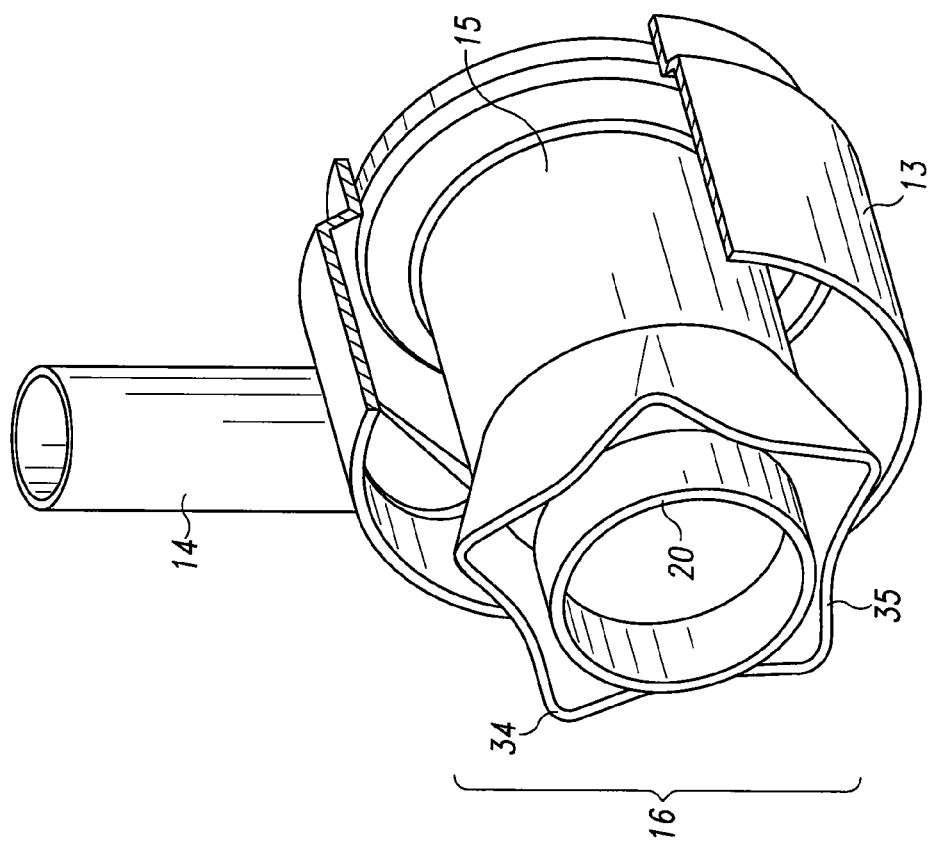
Figure 6:
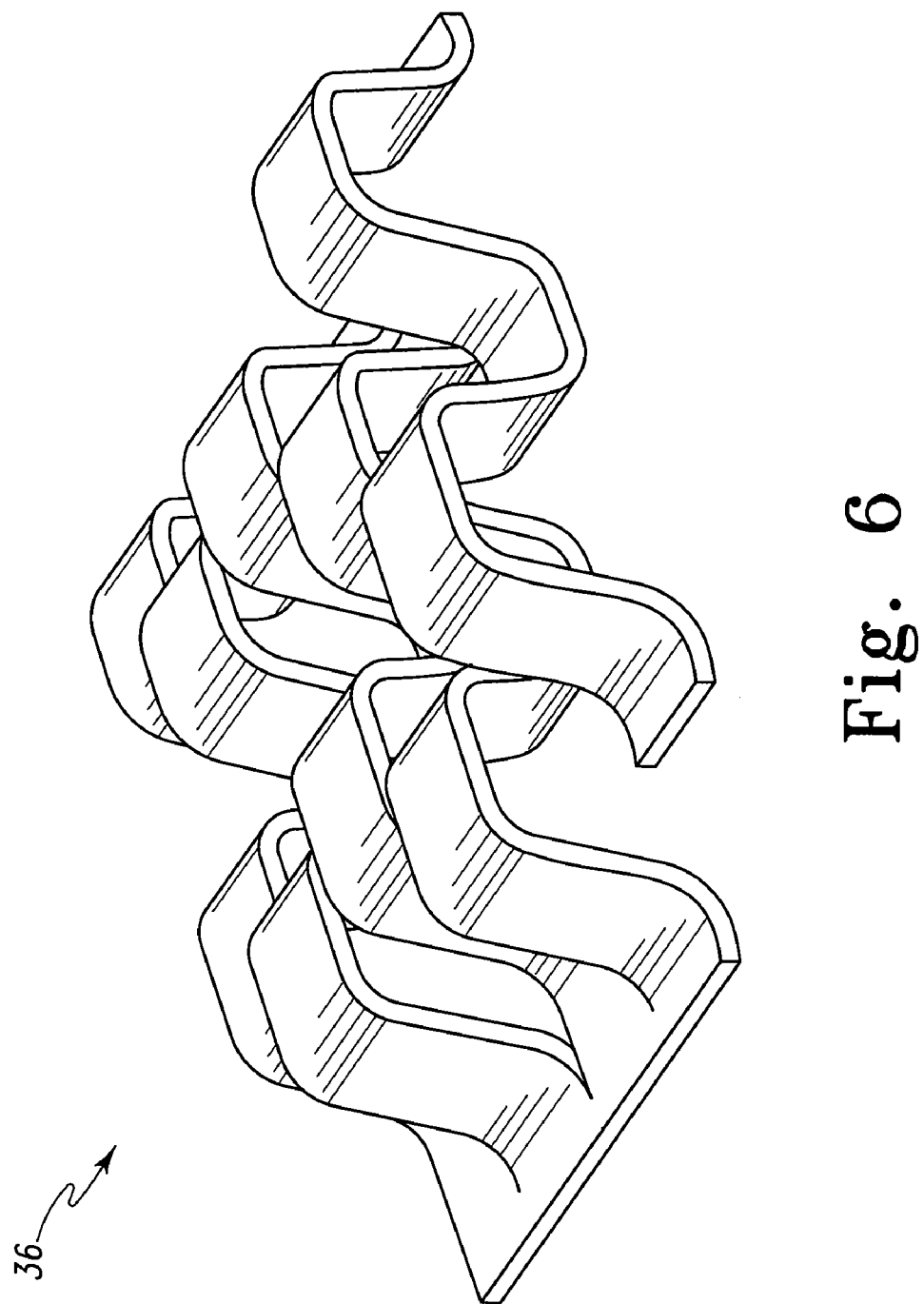
FIG. 6 is a perspective view of a portion of a heat transfer enhancement utilized in a cold fluid flow path of the present invention.

FIGS. 5b and 5c show other alternative embodiments of the mixing structure 16. In the embodiment of FIG. 5b, the mixing structure 16 includes an hourglass-shaped inner tube 15 forming a nozzle with a number of circumferentially spaced apertures 33 located around the perimeter of the nozzle downstream from a minimum diameter of the inner tube 15. The reduction of the flow area inside the inner tube 15 creates a localized region wherein the cathode exhaust flow 6 can enter into the anode exhaust flow 5 through the apertures 33 to produce a well-mixed combined exhaust flow 7. In the illustrated embodiment of FIG. 5b, an end of the hourglass-shaped inner tube 15 (e.g., the left-hand side of the cylinder shown in FIG. 5b) can engage or closely fit the inner surface of the first heat exchange tube 18 to restrict and/or prevent the flow of cathode exhaust 6 around the apertures 33. In the illustrated embodiment of FIG. 5b, the apertures 33 are each generally circular. In other embodiments, one or more elongated slots can be positioned around the inner tube 15. In still other embodiments, the apertures 33 can have other shapes and relative orientations.

In the illustrated embodiment of FIG. 5c, the mixing structure 16 includes a number of radial expansions or protrusions 34 and radial contractions or recesses 35 formed around the perimeter of an exit or distal end of the inner tube 15. In this manner, the mixing structure 16 provides alternating areas of increased flow velocity and decreased flow velocity for the cathode exhaust flow 6 interspersed with alternating areas of increased flow velocity and decreased flow velocity for the anode exhaust flow 5. As is also shown in both FIGS. 5b and 5c, it may be beneficial in all embodiments to locate the cathode exhaust gas inlet port 14 so that the cathode exhaust flow 6 enters the annular flow area in a direction that is tangential to the annular flow area, in order to improve the distribution of the cathode exhaust flow 6 through the hot exhaust mixing region 2. It will be appreciated that forms of the mixing structure 16 other than those shown in FIGS. 5a-5c can be used to achieve the same or substantially the purpose. For example, turbulators can also or alternatively be positioned along the mixing structure 16 to generate turbulence in the anode exhaust flow 5 and the cathode exhaust flow 6. In other embodiments, other surface convolutions or augmentations (e.g., protrusions, recesses, fins, etc.) can be located along the inlet tube 13, the cathode inlet port 14, the inner tube 15, and/or elsewhere in the hot gas mixing region 2 to combine and/or mix the anode and cathode exhaust flows 5, 6.

As shown in FIG. 3, the heat exchange region 3 can have a tube-in-tube construction with a first heat exchange tube 18 supported in a second tube 17. Together, an interior surface of the first heat exchange tube 18 and an exterior surface of an elongated baffle 19 can at least partially define a flow path for the combined exhaust flow 7 through the heat exchange region 3. As shown in FIGS. 3 and 4, an exterior surface of the first heat exchange tube 18 and an interior surface of the second heat exchange tube 17 can at least partially define a flow path for the first air flow 9 through the heat exchange region 3. In other embodiments, the exterior surface of an interior tube and the interior surface of an exterior tube can at least partially define a flow path for the combined exhaust flow 7 through the heat exchange region 3 and an interior surface of the interior tube can at least partially define the flow path for the first air flow 9 through the heat exchange region 3. As shown in FIG. 3, the first heat exchange tube 18 and the second heat exchange tube 17 can be generally cylindrical. In other embodiments, the first and second heat exchange tubes 18, 17 can have other shapes and configurations (e.g., one or both of the first and second heat exchange tubes 18, 17 can have an oval, triangular, square or other polygonal, or irregular cross-sectional shape). Also, while the first and second heat exchange tubes 18, 17 are shown and described herein as being connected together to provide a portion of the heat exchange region 3 of the heat exchanger 1, the first and second heat exchange tubes 18, 17 can alternatively be integrally formed.

One or more fins 30 can be supported between the interior surface of the first heat exchange tube 18 and an exterior surface of the baffle 19 to improve heat transfer between the first air flow 9 and the combined exhaust flow 7 and/or to generate turbulence in the combined exhaust flow 7. In some embodiments, sides of the fins 30 can be secured (e.g., welded, brazed, soldered, etc.) to an interior surface of the first heat exchange tube 18 and/or an exterior surface of the baffle 19. In other embodiments, other fins 30 having other shapes and configurations can also or alternatively be supported in the heat exchange region 3. In some embodiments, the fins 30 and/or the baffle 19 can at least partially define a spiral or other circituitous flow path through the heat exchange region 3. Alternatively or in addition, surface convolutions or augmentations can be formed along or on the inner surface of the first heat exchange tube 18, an exterior surface of the baffle 19, and/or the fins 30 to improve heat transfer between the first air flow 9 and the combined exhaust flow 7 and/or to generate turbulence in the combined exhaust flow 7.

Alternatively or in addition, one or more fins 29 can be supported between the interior surface of the second heat exchange tube 17 and the exterior surface of the first heat exchange tube 18 to improve heat transfer between the first air flow 9 and the combined exhaust flow 7 and/or to generate turbulence in the first air flow 9. In some embodiments, sides of the fins 29 can be secured (e.g., welded, brazed, soldered, etc.) to the inner surface of the second heat exchange tube 17 and the exterior surface of the first heat exchange tube 18. In other embodiments, other fins 29 having other shapes and configurations can also or alternatively be supported in the heat exchange region 3. In some embodiments, the fins 29 can at least partially define a spiral or other circituitous flow path through the heat exchange region 3. Alternatively or in addition, surface convolutions or augmentations can be formed along or on the interior surface of the second heat exchange tube 17, the exterior surface of the first heat exchange tube 18, and/or the fins 29 to improve heat transfer between the first air flow 9 and the combined exhaust flow 7 and/or to generate turbulence in the first air flow 9.

In the illustrated embodiment of FIGS. 1-6, the first air flow 9 and the combined exhaust flow 7 extend through the heat exchange region 3 in opposite directions to provide counter-flow heat transfer. In other embodiments, the heat exchange region 3 can have other flow orientations, such as, for example, parallel-flow or cross-flow.

The combined exhaust flow 7 being at a significantly higher temperature than the first air flow 9, has a significantly greater volumetric flow rate than the first air flow 9. Consequently, it can be advantageous for the cross-sectional area of the flow path for the combined exhaust flow 7 through the heat exchanger 1 (e.g., the annular-shaped area between the exterior surface of the baffle 19 and the interior surface of the first heat exchange tube 18 in the illustrated embodiment of FIG. 3) to be larger than the cross-sectional area of the flow path for the fresh air flow 7 (e.g., the annular-shaped area between the exterior surface of the first heat exchange tube 18 and the interior surface of the second heat exchange tube 17 in the illustrated embodiment of FIG. 3) in order to minimize the pressure drop and/or the overall size of the heat exchanger 1.

In some embodiments, the fins 29 positioned along the flow path for the first air flow 9 can have a greater degree or number of surface convolutions or augmentations than the fins 30 positioned along the flow path for the combined exhaust flow 7, which can reduce the thermal stress effects within the heat exchanger 1. One example of such a surface convolution or augmentation is a lanced and offset fin structure such as the fin structure 36 shown in FIG. 6. Such a fin structure has the effect of biasing the temperature of the portion of the heat exchanger 1 defining the exhaust flow path for the combined exhaust flow 7 (e.g., the area between the interior surface of the first heat exchange tube 18 and the outer surface of the baffle 19 in the illustrated embodiment of FIGS. 3 and 4) to be nearer to the temperature of the colder fluid in the adjacent air channel (e.g., the channel defined between the inner surface of the second heat exchange tube 17 and the outer surface of the first heat exchange tube 18 in the illustrated embodiment of FIGS. 3 and 4) than to the temperature of the combined exhaust flow 7, resulting in a higher material strength for the first heat exchange tube 18. In the illustrated embodiment of FIGS. 2-4, the generally cylindrical structure of the heat exchanger 1 further provides a greater degree of resistance to thermal stress effects due to the inherent lack of stress risers in tubular constructions, as compared to heat exchangers of a bar-plate or other similar construction.

As shown in FIGS. 3 and 4, the fresh air mixing region 4 can be located adjacent to the heat exchanger 1 and downstream from an outlet of the air channel of the heat exchanger 1. As also shown in FIGS. 3 and 4, the fresh air mixing region 4 can be integrally formed with and/or secured to a housing of the heat exchanger 1 to provide a relatively compact assembly. The fresh mixing air region 4 can include a heated fresh air inlet port 26 to receive the heated air flow 10 from the heat exchange region 3 and a bypass fresh air inlet port 27 to receive the second air flow 11. The heated fresh air from the air channel of the heat exchanger 1 and the bypass fresh air can be combined and/or mixed in the fresh air mixing region 4 before being directed downstream toward the cathode side of the fuel cell stack 100. The fresh air mixing region 4 can further include a T-shaped fitting 28 having a first port fluidly connected to the heated fresh air inlet port 26, a second port fluidly connected to the bypass fresh air inlet port 27, and a third port by which combined cathode air flow 12' can be directed.

As shown in FIGS. 3 and 4, the heat exchanger 1 can include a cylinder head 22 sealingly connected to the exhaust gas outlet end of the first heat exchange tube 18 and having a circular opening whose axis is aligned with the axis of the first heat exchange tube 18 to which is sealingly connected an exhaust gas exit tube 24 through which the cooled exhaust flow 8 exits the heat exchanger 1. The heat exchanger 1 can also or alternatively include a conical reducer 23 sealingly connected to the fresh air inlet end of the outer shell cylinder 17 and the outer surface of the exhaust exit tube 24 and having a circular opening to which is sealingly connected an inlet port 25 through which the first air flow 9 enters the heat exchanger 1. In other embodiments, the exhaust exit tube 24 is supported in the conical reducer 23 for movement relative to the conical reducer 23 to accommodate or at least partially accommodate different relative thermal expansions of the first and second heat exchange tubes 18, 17, thereby avoiding thermally induced mechanical stresses in the heat exchanger 1. In some such embodiments, a slip joint is provided between the exhaust exit tube 24 and the conical reducer 23. Alternatively or in addition, the pressure of the first air flow 9 can be maintained above the pressure of the cooled exhaust flow 8 so that any leaking occurring at the slip joint includes air entering the cooled exhaust flow 8 and so that leaking of cooled exhaust 8 into the first air flow 9 is prevented.

A fresh air inlet plenum 37, formed by the outer surface of the cylinder head 22, the inner surface of the conical reducer 23, and the outer surface of the exhaust tube 24, can receive the first air flow 9 from the inlet port 25 and can direct the first air flow 9 toward the air flow path of heat exchange region 3. In some embodiments, the heat exchanger 1 can also include one or more flow restrictions, such as the flow restriction 31 shown in FIGS. 3 and 4, which is located at the exit of the air plenum 37. Such flow restrictions 31 can create a uniform distribution of air flow in the air flow path of heat exchange region 3. Alternatively or in addition, flow restrictions 31 can be positioned along the exhaust flow path or upstream from the exhaust flow path (e.g., in the hot exhaust mixing region 2) to create a uniform distribution of exhaust flow in the exhaust flow path of heat exchange region 3.

A heat exchanger 1 as described above used as an air preheater in a solid oxide fuel cell system 110 has the capability to transfer heat from a combined exhaust flow 7 to a first air flow 9 with a high degree of heat transfer effectiveness. This capability enables the rapid delivery of heat to the fuel cell stacks 100 of the system 110, thus enabling the rapid startup that is seen as desirable for such a system 110. During such a startup mode and when the fuel cell stack temperature is below an operating temperature, the maximum amount of heat addition to the fresh air is achieved when none of the fresh air flow 109 is bypassed around the heat exchanger 1. During normal operation and when the fuel cell stack temperature is at or near an operating temperature, the cathode air flow 12 delivered to the fuel cell cathodes may be at too high of a temperature if the heat exchanger 1 was operated in this same manner. By bypassing a portion of the fresh air flow 109 around the heat exchanger 1 and mixing it with the un-bypassed first air flow 9 downstream of the heat exchange region 3 of the heat exchanger 1, the temperature of the cathode air flow 12 delivered to the cathode will be decreased. The temperature of the cathode air flow 12 delivered to the fuel cell cathodes can thus be controlled by varying the portion of the fresh air flow 109 that is bypassed around the heat exchange region 3.

The embodiments described above and illustrated in the figures are presented by way of example only and are not intended as a limitation upon the concepts and principles of the present invention. As such, it will be appreciated by one having ordinary skill in the art that various changes are possible.

What is claimed is:

1. A solid oxide fuel cell system comprising:
a fuel cell stack having an anode side and a cathode side;
an anode tailgas oxidizer for oxidizing an anode exhaust flow from the anode side of the fuel cell stack to produce an oxidized anode exhaust flow;
a heat exchanger including a first inlet for receiving a cathode exhaust flow from the cathode side of the fuel cell stack, a second inlet for receiving the oxidized anode exhaust flow, and a mixing region for combining the cathode exhaust flow and the oxidized anode exhaust flow to produce a combined exhaust flow; and
an air flow path for supplying air to the fuel cell stack to support an energy-producing reaction in the fuel cell stack and extending through the heat exchanger so that heat is transferred from the combined exhaust flow to the air traveling along the air flow path.

2. The solid oxide fuel cell system of claim 1, wherein the heat exchanger includes a first tube supported in a second tube, one of the first tube and the second tube at least partially defining a combined exhaust flow path for the combined exhaust flow and another of the first tube and the second tube being positioned along the air flow path.

3. The solid oxide fuel cell system of claim 2, wherein the combined exhaust flow path is counter to the air flow path.

4. The solid oxide fuel cell system of claim 2, wherein the one of the first tube and the second tube includes heat transfer surface augmentations positioned along the combined exhaust flow path.

5. The solid oxide fuel cell system of claim 2, wherein the other of the first tube and the second tube includes heat transfer surface augmentations positioned along the air flow path.

6. The solid oxide fuel cell system of claim 2, wherein the one of the first tube and the second tube includes a fin positioned along the combined exhaust flow path.

7. The solid oxide fuel cell system of claim 2, wherein the other of the first tube and the second tube includes a fin positioned along the air flow path.

8. The solid oxide fuel cell system of claim 1, wherein the mixing region includes turning vanes.

9. The solid oxide fuel cell system of claim 1, wherein the mixing region includes a nozzle for mixing the cathode exhaust flow and the oxidized anode exhaust flow.

10. The solid oxide fuel cell system of claim 1, further comprising a tube extending through the mixing region and at least partially defining one of the first inlet and the second inlet and including fluid mixing surface augmentations for mixing the cathode exhaust flow and the oxidized anode exhaust flow.

11. The solid oxide fuel cell system of claim 1, wherein the mixing region is supported in an interior of the heat exchanger.

* * * * *